Figures 1, 2:
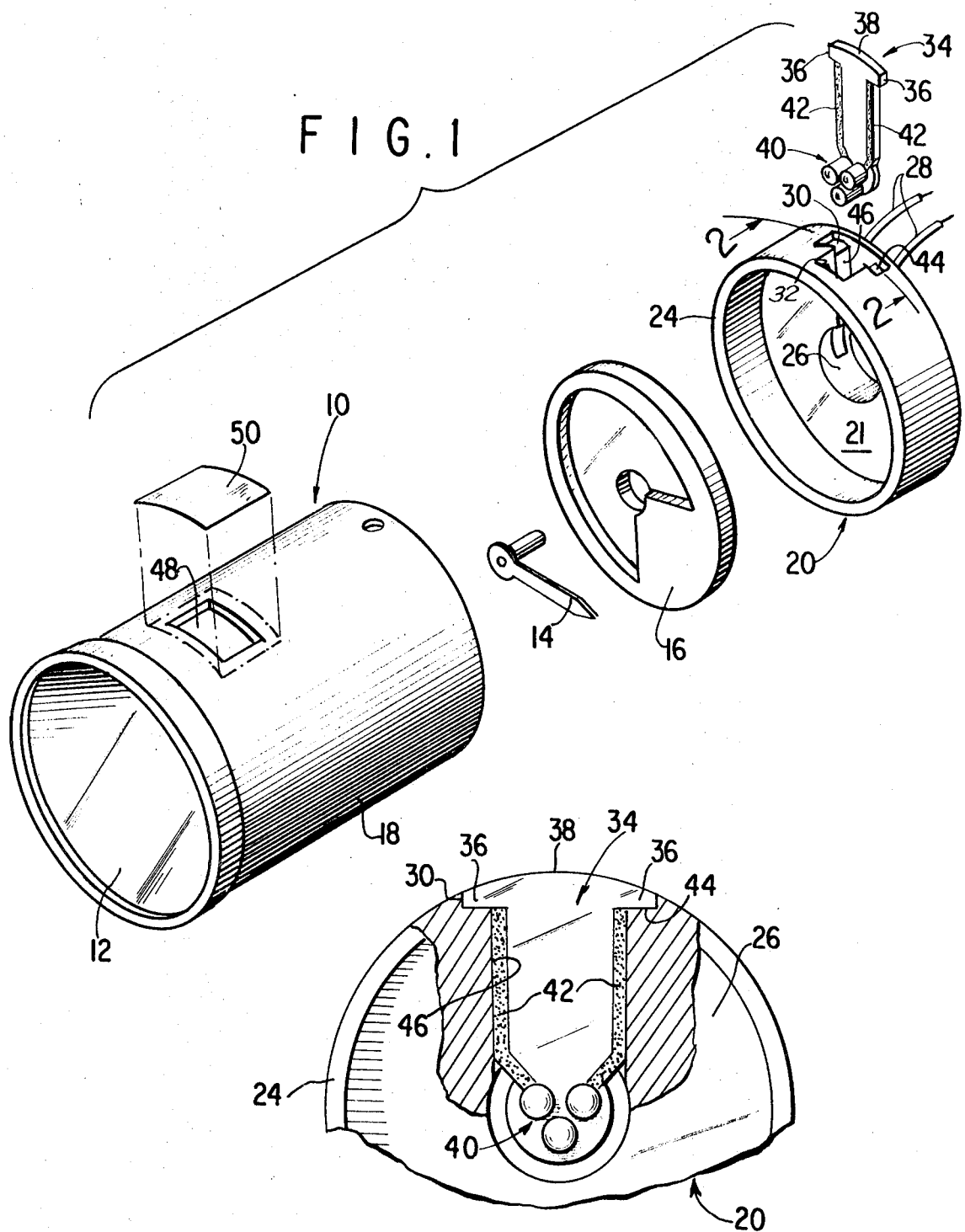

United States Patent

[11] 3,603,779

[72] Inventors Edgar J. Horne
Perkasie;
Ralph C. Spohn, Greenlane, both of, Pa.
[21] Appl. No. 830,785
[22] Filed June 5, 1969
[45] Patented Sept. 7, 1971
[73] Assignee Ametek, Inc.
New York, N.Y.

[54] INSTRUMENT ILLUMINATION
3 Claims, 2 Drawing Figs.
[52] U.S. Cl. ................................. 240/2.1,
240/8.16
[51] Int. Cl. .................................. G01d 11/28
[50] Field of Search ........................... 240/2.1, 1
EI, 8.16

[56] References Cited
FOREIGN PATENTS
582,315 9/1944 Great Britain ............... 240/2.1
OTHER REFERENCES
" Brite-Eye," Cal-Glo Company, Publication # BE3 5M
10– 64, dated Apr. 30, 1965

Primary Examiner—Samuel S. Matthews
Assistant Examiner—Russell E. Adams, Jr.
Attorney—Smythe & Moore ABSTRACT: An instrument casing, particularly for aircraft, is provided with a removable unit carrying a printed circuit element carrier having one or more light bulbs adjacent its end and insertable through a suitably shaped slot in the casing element. The printed circuit carrier is guided in such radial movement and provided with stop means to position the same.

PATENTED SEP 7 1971

3,603,779

INVENTORS
EDGAR J. HORNE
RALPH C. SPOHN
BY
Smythe & Moore
ATTORNEYS

INSTRUMENT ILLUMINATION

This invention relates to lighting assemblies for instruments. Aircraft instruments have usually been provided with light bulbs for illuminating the dials or indicia thereof. The bulbs have been difficult to replace when the illuminating elements burn out or fail. Further, it has been necessary to dismantle the instrument and to disturb the instrument panel with resultant loss of time and requirement that the plane be taken out of service when lamps fail.

One of the objects of the invention is to provide an instrument illuminating system that can be easily replaced with a minimum of time loss.

In one form, a unit carrying the illuminating means for the dial is insertable into the usual instrument casing or support, the illuminating means including a carrier for one or more lamp bulbs. The carrier preferably can have a printed circuit thereon and can be insertable through a slot in the casing unit to an operative position. Guide means may be provided for the carrier upon which the light bulbs are mounted. The guide means include shoulders to limit the radial inward movement to a position with the light or lights arranged substantially centrally of the casing or the desired position relative to the indicator or dial.

These and other objects, advantages and features of the invention will become apparent from the following description and drawings which are merely exemplary.

In the drawings:

FIG. 1 is an exploded perspective view of the several elements of one form of use of the device; and FIG. 2 is an enlarged fragmentary section taken in the direction of line 2—2 of FIG. 1.

Reference may be made to FIG. 1 wherein numeral 10 designates an instrument which may be of the type used extensively for aircraft. Sight glass 12 can be used to cover the front of the casing or instrument. Pointer 14 cooperates with dial 16 in the usual manner.

Referring to FIGS. 1 and 2, rear casing member 20 can be provided with the usual backwall 21 having an opening 26. In the form shown, rear casing member 20 has an external diameter equal to the internal diameter of the main instrument casing 18 and is slidable therein. The rear casing member 20 is provided with electrical leads 28 connected to terminals (not shown) in the wall of the rear casing member 20. The casing 20 can take other forms and can have the lens mounted directly thereon covering dial 16 and pointer 14 in the usual manner.

Carrier member 34 has upper opposite edge portions 36 extending beyond the body of the carrier. A radially shaped outer edge surface 38 of the carrier has a curvature corresponding to the curvature of casing member 20 for a purpose which will become apparent. Carrier 34 is of insulating material and preferably carries a printed circuit connectable to the terminals of the leads 28 to supply energy to illuminating means 40 shown in the present instance as a cluster of three electric light bulbs. It will be apparent that one or more bulbs may be employed. For carrying energy or current to the bulbs, carrier 34 has the printed circuit arrangement 42 leading to light bulbs 40.

The main portion of slot 30 in the annulus of the rear casing 20 and extending inwardly of rear wall 21 thereof corresponds to the edgewise dimensions of the carrier 34 for the insertion of the latter therethrough. The longitudinally extending slot portion can be of such size as to permit the insertion radially into the casing member 20. Wall 26 is shouldered so as to engage shoulders 36 to limit radially inward movement of the illuminating unit when inserted through radial slot 30 so as to properly position the same. The rear wall 21 of casing 20 is provided with substantially radial guides 46 to guide the illuminating unit radially into position when inserted.

If a main instrument casing is used, a sight opening 48 (FIG. 1) can be normally closed by cover 50. When the parts are assembled, cover 50 may be removed to give access to the illuminating assembly.

The illuminating unit is inserted radially through slot 30 until shoulders 36 rest on the shoulders 44, such movement being guided by the ribs or guides 46. When so inserted, the radially extending outer edge 38 of the light unit will form a continuation of the cylindrical outer surface of the rear casing member 20. Suitable elements of the printed circuit carried by the insulating body 34 will engage terminals (not shown) of leads 28 to supply current to the light bulbs. The pointer 14 and dial 16 are inserted into their normal conventional positions in relation to the movement.

The rear casing member 20 then can be inserted through the open end of the main casing 18 and the latter will be provided with means (not shown) for properly positioning the rear casing member 20 within casing 18. The bulbs 40 will be operative for illuminating the dial and pointer of the instrument. The top end of the carrier 34 fills the slot 30 when the parts are in operative position. However, the slot is enlarged as at 32, and will be open through the annular wall portion 24 to permit passage of the lamps 40 therethrough when assembly and disassembly of the carrier.

It will be apparent that the device provides in illuminating unit which is entirely self-contained and which cooperates with the other elements of the structure to provide illumination for the instrument dial. It also will be apparent that the replacing of a burned-out light unit may be accomplished in a matter of seconds by following the procedural steps outlined above.

It will be understood that various details of construction and arrangement of parts may be made without departing from the spirit of the invention.

What is claimed is:

1. An indicating instrument having a casing means with a sidewall and open and closed ends through which dial means associated with said open end is viewable, indicating pointer means on said dial means, slotted guide means extending radially inwardly of said casing means between said dial means and said closed end thereof, an illuminating unit including a relatively flat elongated carrier removably insertable through said sidewall and in said guide means, printed circuit means on said carrier, means to supply energy to said circuit means, light bulb means mounted on said carrier and projecting toward the open end of said casing means and arranged so that when activated by said circuit and energy supply, said dial means will be illuminated.

2. An instrument according to claim 1 wherein said carrier is provided with circumferentially extending shoulders at opposite edges, said slotted guide means being recessed to provide shoulders engageable with the shoulders of said carrier to position the latter in operative position in said casing means.

3. An instrument according to claim 2 wherein said carrier is flat in cross section and said light bulb means is arranged at the radially inner end of said carrier when the latter is inserted through said slotted guide, said slot means having main portion corresponding in cross-sectional shape to said carrier and a transverse portion through which said light bulb is movable into said casing means.